US011807486B2

(12) United States Patent
Arima et al.

(10) Patent No.: US 11,807,486 B2
(45) Date of Patent: Nov. 7, 2023

(54) SENSOR CONTROL APPARATUS AND IMAGE APPARATUS

(71) Applicant: CANON KABUSHIKI KAISHA, Tokyo (JP)

(72) Inventors: Makoto Arima, Abiko (JP); Takeshi Honda, Kashiwa (JP); Mitsuhiro Sugeta, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 913 days.

(21) Appl. No.: 16/812,853

(22) Filed: Mar. 9, 2020

(65) Prior Publication Data
US 2020/0207570 A1   Jul. 2, 2020

Related U.S. Application Data

(63) Continuation of application No. PCT/JP2018/046831, filed on Dec. 19, 2018.

(30) Foreign Application Priority Data

Dec. 22, 2017 (JP) .................................. 2017-246944
Dec. 18, 2018 (JP) .................................. 2018-236028

(51) Int. Cl.
*B65H 43/08* (2006.01)
*G06F 3/12* (2006.01)
*B65H 7/14* (2006.01)

(52) U.S. Cl.
CPC ............... *B65H 43/08* (2013.01); *B65H 7/14* (2013.01); *G06F 3/1279* (2013.01); *B65H 2553/412* (2013.01); *G03G 2215/00616* (2013.01)

(58) Field of Classification Search
CPC ....................... B65H 43/08; G03G 2215/00616
(Continued)

(56) References Cited

U.S. PATENT DOCUMENTS 4,743,941 A * 5/1988 Takano ............... G03G 15/6514
399/21
5,140,622 A * 8/1992 Shino ................... G08B 26/005
340/508
(Continued)

FOREIGN PATENT DOCUMENTS

CN 1627195 A 6/2005
CN 103227453 A 7/2013
(Continued)

OTHER PUBLICATIONS

Chinese Search Report dated Jun. 9, 2021 in corresponding Chinese Application No. 201880060300.5 (English translation included).
(Continued)

*Primary Examiner* — Ryan Jager
(74) *Attorney, Agent, or Firm* — VENABLE LLP

(57) ABSTRACT

A sensor control apparatus includes a control unit, a plurality of sensors connected in series to the control unit. Each of the plurality of sensors includes a detector configured to perform a detection operation based on a first voltage applied from the control unit, a first switch provided on an application path for applying a voltage, a second switch provided on a supply path for supplying the voltage applied from the control unit to a sensor connected in a subsequent stage, and a conduction control unit. The control unit brings the first switch into conduction and cut off the second switch in a case where the voltage on the application path is the first voltage, and cuts off the first switch and bring the second switch into conduction in a case where the voltage on the application path is a second voltage.

13 Claims, 9 Drawing Sheets

(58) Field of Classification Search
USPC .......................................................... 327/20
See application file for complete search history.

(56) References Cited

U.S. PATENT DOCUMENTS

| | | | |
|---|---|---|---|
| 6,946,640 B1 * | 9/2005 | Kawamura | H04N 1/32571 |
| | | | 250/214 R |
| 7,379,678 B2 * | 5/2008 | Motoyama | G03G 15/234 |
| | | | 399/361 |
| 9,193,547 B2 * | 11/2015 | Suzuki | B65H 7/02 |
| 9,270,163 B2 | 2/2016 | Shimura | |
| 11,447,352 B2 * | 9/2022 | Sugeta | G03G 21/00 |
| 2005/0129416 A1 * | 6/2005 | Kim | G03G 15/6508 |
| | | | 399/18 |

FOREIGN PATENT DOCUMENTS

| | | |
|---|---|---|
| CN | 103569700 A | 2/2014 |
| JP | 11-242538 | 9/1999 |
| JP | 2000-307789 A | 11/2000 |
| JP | 2008-59161 | 3/2008 |

OTHER PUBLICATIONS

U.S. Appl. No. 16/744,524, filed Jan. 16, 2020 by Takeshi Honda.
U.S. Appl. No. 16/823,593, filed Mar. 19, 2020 by Mitsuhiro Sugeta.

* cited by examiner

SENSOR CONTROL APPARATUS AND IMAGE APPARATUS

CROSS-REFERENCE TO RELATED APPLICATIONS

This application is a Continuation of International Patent Application No. PCT/JP2018/046831, filed Dec. 19, 2018, which claims the benefit of Japanese Patent Application No. 2017-246944, filed Dec. 22, 2017 and Japanese Patent Application No. 2018-236028, filed Dec. 18, 2018, each of which is hereby incorporated by reference herein in their entirety.

BACKGROUND OF THE INVENTION

Field of the Invention

The present disclosure relates to an image forming apparatus such as a copying machine or a printer, and more particularly, to a technology for controlling a sensor provided in an image forming apparatus.

Background Art

In an image forming apparatus and an auto document feeder (ADF), a large number of sensors are arranged in order to control internal devices. For example, the image forming apparatus is mounted with a large number of sensors including a sensor for detecting presence or absence of a sheet, a sensor to be used for detecting a conveying position of the sheet, and a sensor for detecting opening or closing of an exterior cover of the apparatus. The image forming apparatus or other such apparatus controls the internal devices based on detection results of the sensors, to thereby perform, for example, sheet conveyance control. To that end, a large number of sensors arranged at various positions in the apparatus and a control board configured to acquire the detection results of the sensors and perform control are connected to one another through a cable. As the number of sensors increase, the number of cables to be used inside the apparatus also increases. As the number of cables increases, the wiring space and the space of connectors on the control board increase. The increase in number of cables and space of connectors hinders downsizing of the entire apparatus, and cause an increase in cost.

Therefore, there is proposed a technology for reducing the number of cables and the number of connectors by connecting a plurality of sensors in series (see Patent Literature 1). The sensors each include a resistor having a different resistance value. For example, the detection result is obtained when the sheet is detected by one of the sensors, and is represented by a voltage value different from that of any other one of the sensors. Therefore, it is possible to discriminate which sensor the detection result has been obtained from.

In a case where a plurality of sensors including resistors having mutually different resistance values are connected in series, an order in which the sensors are connected in series is determined based on the resistance values. In a case where a connection order of sensors is mistaken, detection results obtained by the respective sensors are mixed up. Outer shapes of the respective sensors can also be made unique based on the resistance values so as to avoid causing a mistake in correspondences between the resistance values of the sensors and places thereof in the connection order. However, in this case, the sensors increase in kind (resistance value and outer shape), to thereby cause a problem of, for example, an increase in management cost due to a higher cost of components and more complicated component management. In a case where a plurality of sensors having the same configuration are connected in series, it is difficult to determine which sensor a detection result is based on, and it is required to provide a more sophisticated and high-cost configuration, for example, a configuration for transmitting and receiving a detection result by packet communication. The present disclosure has been made in view of the above-mentioned problems, and has an object to provide a sensor control apparatus, which requires no sophisticated control for a sensor, and is capable of enabling each sensor to independently perform a detection operation even with a configuration in which a plurality of sensors having the same configuration are connected in series.

CITATION LIST

Patent Literature

PTL 1 Japanese Patent Laid-Open No. 2008-59161

SUMMARY OF THE INVENTION

A sensor control apparatus according to one embodiment of the present disclosure includes: a control unit; and a plurality of sensors connected in series to the control unit, each of the plurality of sensors including: a detector configured to perform a detection operation based on a first voltage applied from the control unit; a first switch provided on an application path for applying a voltage, which extends from the control unit to the detector; a second switch provided on a supply path for supplying the voltage applied from the control unit to a sensor connected in a subsequent stage; and a conduction control unit configured to: bring the first switch into conduction and cut off the second switch in a case where the voltage on the application path is the first voltage; and cut off the first switch and bring the second switch into conduction in a case where the voltage on the application path is a second voltage, which is different from the first voltage, wherein the control unit is configured to cause a sensor in a first stage to perform the detection operation by applying the first voltage to the sensor in the first stage, and then cause a sensor in a second stage to perform the detection operation by applying the second voltage and then applying the first voltage.

Further features of the present invention will become apparent from the following description of exemplary embodiments with reference to the attached drawings.

DESCRIPTION OF EMBODIMENTS

Now, embodiments of the present disclosure are described in detail with reference to the accompanying drawings.

First Embodiment

Figure 1:
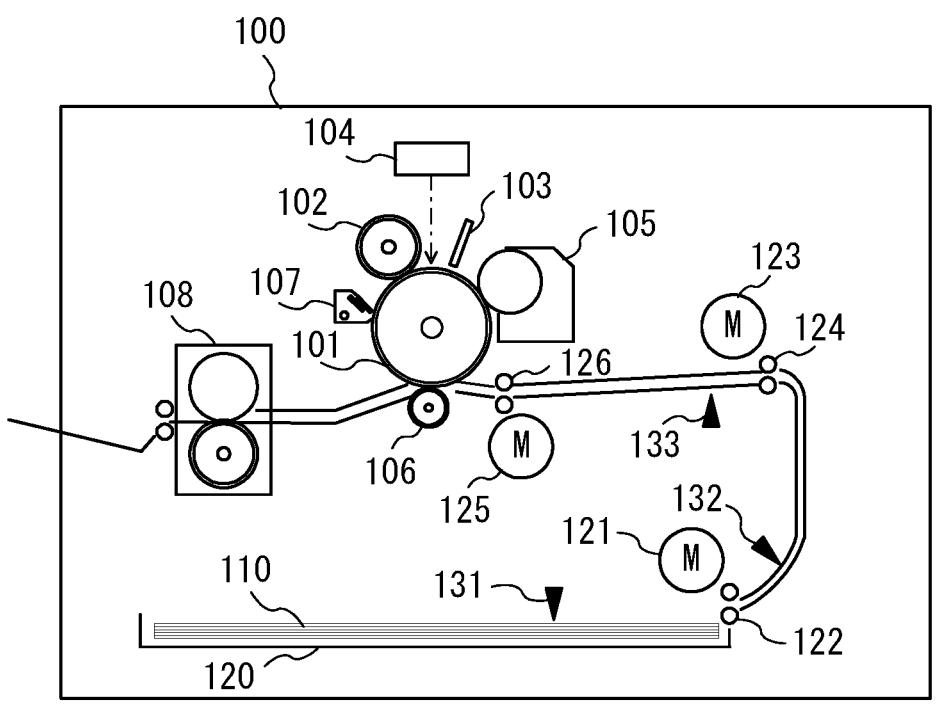
FIG. 1 is a configuration diagram of an image forming apparatus.

FIG. 1 is a configuration diagram of an image forming apparatus including a sensor control apparatus according to a first embodiment of the present disclosure. An image forming apparatus 100 employs an electrophotographic method. The image forming apparatus 100 includes a photosensitive member 101 to be used for image formation, a charging device 102, a potential sensor 103, an exposure device 104, a developing device 105, a transfer unit 106, a cleaner 107, and a fixing device 108. In order to feed a sheet 110, the image forming apparatus 100 includes a sheet feeding cassette 120 configured to receive the sheet 110, sheet feeding rollers 122, conveyance rollers 124, and conveyance rollers 126. A plurality of sensors 131, 132, and 133 are provided on a conveyance path along which the sheet 110 is to be fed. The sensor 131 in the first stage, the sensor 132 in the second stage, and the sensor 133 in the third stage are arranged at predetermined intervals in order from an upstream side in a conveyance direction of the sheet 110. The image forming apparatus 100 includes stepping motors 121, 123, and 125. The operation of the image forming apparatus 100 has its operation controlled by a controller (not shown).

The charging device 102 uniformly charges a surface of the photosensitive member 101. The photosensitive member 101 having the surface uniformly charged is exposed by the exposure device 104 in accordance with an image signal, to thereby form thereon an electrostatic latent image corresponding to the image signal. The developing device 105 develops the electrostatic latent image to form a toner image on the surface of the photosensitive member 101. In order to measure a potential of the electrostatic latent image, the potential sensor 103 is provided between an exposure position by the exposure device 104 and a developing position by the developing device 105. The toner image formed on the surface of the photosensitive member 101 is transferred onto the sheet 110, which is fed by a sheet feeding cassette 120, by the transfer unit 106. Transfer residual toner remaining on the photosensitive member 101 after the transfer is collected by the cleaner 107. The sheet 110 onto which the toner image has been transferred has the toner image fixed by the fixing device 108, and is delivered from the image forming apparatus 100. With the above-mentioned operation, a product on which an image is printed is obtained.

Now, a sheet feeding operation of the sheet 110 is described. When starting the sheet feeding operation, the controller detects presence or absence of the sheet 110 in the sheet feeding cassette 120 by the sensor 131. In a case where the sheet 110 is present in the sheet feeding cassette 120, the controller starts to feed the sheet 110 received in the sheet feeding cassette 120 by the sheet feeding rollers 122. The controller causes the stepping motor 121 to drive the sheet feeding rollers 122. The sheet feeding rollers 122 convey the sheets 110 one by one from the sheet feeding cassette 120 to the conveyance rollers 124. The sensor 132 is provided on a conveyance path between the sheet feeding rollers 122 and the conveyance rollers 124. The sensor 132 detects whether or not the sheet 110 has passed through a detection position defined on the conveyance path extending from the sheet feeding rollers 122 to the conveyance rollers 124. The controller detects whether or not the sheet 110 has passed through the detection position within a predetermined timing based on a detection result of the sensor 132.

The conveyance rollers 124 are rotated by the stepping motor 123. In a case where the sensor 132 detects the sheet 110, the controller causes the stepping motor 123 to drive the conveyance rollers 124. The conveyance rollers 124 are thus rotated, to thereby convey the sheet 110, which has been conveyed from the sheet feeding rollers 122, to the conveyance rollers 126. The sensor 133 is provided on the conveyance path between the conveyance rollers 124 and the conveyance rollers 126. The sensor 133 detects whether the sheet 110 has passed through a detection position defined on the conveyance path extending from the conveyance rollers 124 to the conveyance rollers 126. The controller detects whether or not the sheet 110 has passed through the detection position within a predetermined timing based on a detection result of the sensor 133.

The conveyance rollers 126 are rotated by the stepping motor 125. In a case where the sensor 133 detects the sheet 110, the controller causes the stepping motor 125 to drive the conveyance rollers 126. The conveyance rollers 126 are thus rotated, to thereby convey the sheet 110, which has been conveyed from the conveyance rollers 124, to the transfer unit 106. A timing at which the conveyance rollers 126 convey the sheet 110 to the transfer unit 106 is adjusted in accordance with a timing at which the toner image formed on the photosensitive member 101 is conveyed to the transfer unit 106. With this adjustment, the toner image is transferred onto the sheet 110 while the sheet 110 and the toner image formed on the photosensitive member 101 pass through the transfer unit 106 in an overlapping state. The controller may also control the conveyance speed of the sheet 110 conveyed by the conveyance rollers 126 so that the toner image on the photosensitive member 101 passes through the transfer unit 106 while overlapping with the sheet 110.

The sensors 131, 132, and 133 in this embodiment are each formed of, for example, a photo interrupter. In this case, the sensors 131, 132, and 133 each include a light emitter (for example, a light emitting diode (LED)) and a light receiver (for example, phototransistor) configured to receive light emitted from the light emitter. The sheet 110 pushes a shielding object provided at the detection position on the conveyance path to block an optical path formed between the LED and the phototransistor, to thereby allow the sensors 131, 132, and 133 to detect the sheet 110. However, a configuration of each of the sensors 131, 132, and 133 is not limited thereto as long as the configuration allows the sheet 110 being conveyed along the conveyance path to be detected at the detection position. For example, in the configuration, the LED and the phototransistor may be arranged so as to be opposed to each other across the conveyance path, and the optical path may be blocked when the sheet 110 passes through the conveyance path. In another case, in the configuration, an optical path to the phototransistor may be formed by causing light emitted from the LED to be reflected by the sheet 110 on the conveyance path.

Figure 2:
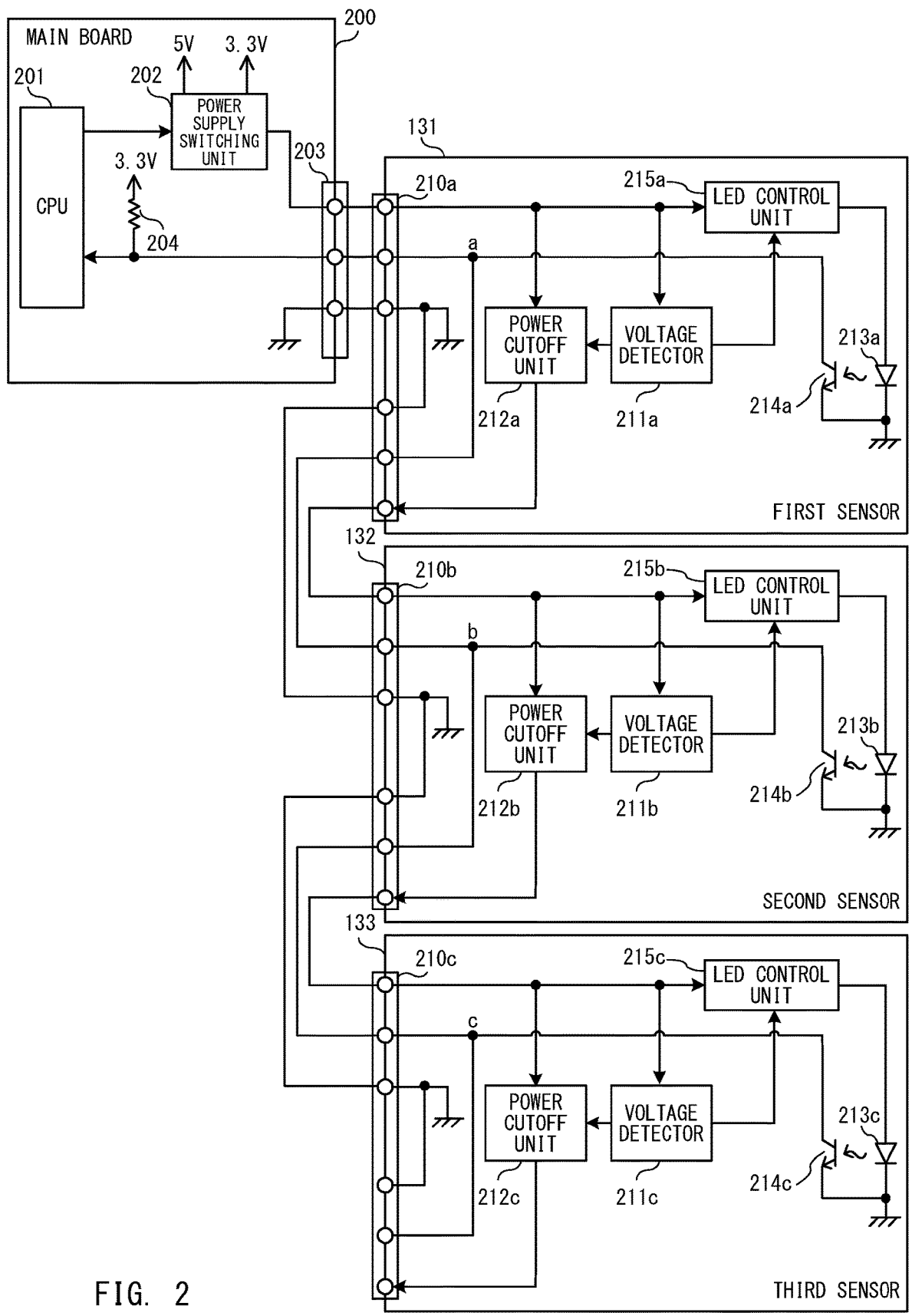
FIG. 2 is a configuration diagram of a main board and sensors.

FIG. 2 is a configuration diagram of a main board, which is included in the controller, and sensors. In the following description, the sensor 131 is referred to as "first sensor 131". The sensor 132 is referred to as "second sensor 132". The sensor 133 is referred to as "third sensor 133". The main board 200 is a sensor control apparatus configured to control operations of the first sensor 131 to the third sensor 133 to acquire detection results of those sensors.

The first sensor 131 to the third sensor 133 are connected in series to the main board 200. With the side at which the main board 200 is provided being upstream side, the first sensor 131 to the third sensor 133 are connected to the main board 200 in order of the first sensor 131, the second sensor 132, and the third sensor 133 from the upstream side. The first sensor 131 to the third sensor 133 have the same internal configuration. The main board 200 and the first sensor 131, the first sensor 131 and the second sensor 132, and the second sensor 132 and the third sensor 133 are connected by different power supply lines and different signal lines. A power supply voltage is applied from the main board 200 to the first sensor 131 to the third sensor 133 by the power supply lines. The respective detection results of the first sensor 131 to the third sensor 133 are input to the main board 200 by the signal lines. The main board 200, the first sensor 131, the second sensor 132, and the third sensor 133 are connected to a common ground.

The main board 200 includes at least a central processing unit (CPU) 201 configured to control the operations of the first sensor 131 to the third sensor 133 and a power supply switching unit 202 configured to switch the power supply voltage to be applied to the first sensor 131 to the third sensor 133. The power supply switching unit 202 applies the power supply voltage having three different kinds of voltage values to the first sensor 131 to the third sensor 133. The power supply switching unit 202 in this embodiment switches the power supply voltage to be applied to the first sensor 131 to the third sensor 133 among the following three kinds of voltage values: 0 V, 3.3 V, and 5 V. The main board 200 includes a pull-up resistor 204 for acquiring the detection results of the first sensor 131 to the third sensor 133. A predetermined voltage (in this case, 3.3 V) is applied to one end of the pull-up resistor 204. The main board 200 includes a connector 203 for connection to the first sensor 131 through a power supply line and a signal line.

The first sensor 131 includes a connector 210a, a voltage detector 211a, a power cutoff unit 212a, an LED 213a, a phototransistor 214a, and an LED controller 215a. The connector 210a is not only connected to the main board 200 through the power supply line and a signal line, but also connected to the second sensor 132 provided on a downstream side through another power supply line and another signal line.

The voltage detector 211a detects the power supply voltage applied from the main board 200, and outputs a control signal for performing conduction control of the power cutoff unit 212a and the LED controller 215a based on the voltage value. An operation of the voltage detector 211a is described later in detail.

The power cutoff unit 212a includes a switching element on a supply path for supplying the power supply voltage to the sensor (second sensor 132) in the subsequent stage. The power cutoff unit 212a switches a supply state of the power supply voltage applied from the main board 200 to the second sensor 132 in the subsequent stage when the switching element is switched based on the control signal from the voltage detector 211a. The switching element is, for example, a metal oxide semiconductor (MOS) field effect transistor (FET). When the control signal (voltage value) from the voltage detector 211a becomes lower than the power supply voltage applied from the main board 200 by a gate threshold voltage (for example, 1 V), the FET is brought into a cutoff state. In this case, the power cutoff unit 212a inhibits the power supply voltage from being supplied to the second sensor 132 in the subsequent stage.

The LED 213a is a light emitter configured to emit light by an electric current flowing based on the power supply voltage applied from the main board 200. The phototransistor 214a is a light receiver configured to receive the light emitted from the LED 213a to operate. In this embodiment, the state of the phototransistor 214a is changed to the conductive state when the phototransistor 214a receives the light. A collector terminal of the phototransistor 214a is connected to the pull-up resistor 204 and the CPU 201 of the main board 200 through the signal line. In a case where the phototransistor 214a is in the conductive state, a ground voltage (0 V) is input to the CPU 201 as the detection result of the first sensor 131. In a case where the phototransistor 214a is in the cutoff state, the voltage (3.3 V) to be applied to the pull-up resistor 204 is input to the CPU 201 as the detection result of the first sensor 131. The phototransistor 214a itself is in a high impedance state when it is in the cutoff state. In this manner, the CPU 201 can detect the conductive state or the cutoff state (open state) of the phototransistor 214a. The phototransistor 214a is brought into the cutoff state when, for example, the light emitted from the LED 213a is blocked by the sheet 110. The CPU 201 can detect the sheet 110 by detecting the cutoff state.

The LED controller 215a includes a switching element on the path for applying the power supply voltage to the LED 213a. The LED controller 215a switches an application state of the power supply voltage applied from the main board 200 to the LED 213a by switching the switch element based on a control signal from the voltage detector 211a. The switching element is, for example, a MOS FET. When the voltage of the control signal from the voltage detector 211a becomes lower than the power supply voltage applied from the main board 200 by the gate threshold voltage (for example, 1 V), the FET is brought into a cutoff state, and the LED controller 215a does not apply the power supply voltage to the LED 213a. When the power supply voltage is not applied to the LED 213a, an electric current does not flow therethrough, with the result that the LED 213a does not emit light.

Now, the operation of the voltage detector 211a is described. The voltage detector 211a detects falling of the power supply voltage applied from the main board 200 with, for example, a threshold value of 4 V. The voltage detector 211a is in a "first state" in an initial state at power-on, and maintains the first state until the falling of the applied power supply voltage across 4 V is detected after the applied power supply voltage temporarily becomes equal to or higher than 4 V (for example, 5 V). The voltage detector 211a detects the falling across 4 V when the applied power supply voltage decreases from 5 V to 3.3 V. In this case, the voltage detector 211a is brought into a "second state". The voltage detector 211a that has been brought into the second state maintains the second state until the power supply voltage applied from the main board 200 changes to 0 V irrespective of the power supply voltage. The changing of the power supply voltage applied from the main board 200 to 0 V is referred to as "initialization".

While being in the initial state (first state) at power-on, the voltage detector 211a controls the power cutoff unit 212a to be in a cutoff state in which the power supply voltage is not supplied to the second sensor 132 on the downstream side. While being in the second state, the voltage detector 211a controls the power cutoff unit 212a to be in a conductive state in which the power supply voltage is supplied to the second sensor 132 on the downstream side. That is, the voltage detector 211a controls the power cutoff unit 212a to be in a conductive state in response to the falling of the power supply voltage from 5 V to 3.3 V. The voltage detector 211a maintains the power cutoff unit 212a in the conductive state until the power supply voltage reaches 0 V.

While being in the first state, the voltage detector 211a controls the LED controller 215a to be in a conductive state in which an electric current is supplied to the LED 213a to cause the LED 213a to emit light. In the conductive state, the LED 213a emits light based on the power supply voltage. While being in the second state, the voltage detector 211a controls the LED controller 215a to be in a cutoff state in which the electric current supplied to the LED 213a is cut off to cause the LED 213a to turn out the light. That is, the voltage detector 211a controls the LED control unit (or controller) 215a to cause the LED 213a to turn out the light in response to the falling of the power supply voltage from 5 V to 3.3 V. Even when the power supply voltage rises from 3.3 V to 5 V, the LED control unit 215a maintains the cutoff state. Therefore, the LED 213a keeps the light turned out.

A connector 210b of the second sensor 132 is not only connected to the first sensor 131 on the upstream side through the power supply line and the signal line, but also connected to the third sensor 133 provided on the downstream side through another power supply line and another signal line. The second sensor 132 includes a voltage detector 211b, a power cutoff unit 212b, an LED 213b, a phototransistor 214b, and an LED controller 215b. Operations of the respective components are the same as the operations of the respective corresponding components of the first sensor 131, and hence descriptions thereof are omitted.

A collector terminal of the phototransistor 214b of the second sensor 132 is connected to the signal line for connecting the collector terminal of the phototransistor 214a and the connector 210a at a contact "a" in the first sensor 131. Therefore, an output value of the signal line for connecting the first sensor 131 and the main board 200 is variable based on an output value of the phototransistor 214b.

A connector 210c of the third sensor 133 is connected to the second sensor 132 on the upstream side through the power supply line and the signal line. The third sensor 133 is arranged on the most downstream side of series connection, and hence no component in its subsequent stage is connected to the connector 210c. The third sensor 133 includes a voltage detector 211c, a power cutoff unit 212c, an LED 213c, a phototransistor 214c, and an LED controller 215c. Operations of the respective components are the same as the operations of the respective corresponding components of the first sensor 131, and hence descriptions thereof are omitted.

A collector terminal of the phototransistor 214c of the third sensor 133 is connected to the signal line for connecting the collector terminal of the phototransistor 214b and the connector 210b at a contact "b" in the second sensor 132. The signal line for connecting the collector terminal of the phototransistor 214b and the connector 210b is connected to the signal line for connecting the collector terminal of the phototransistor 214a and the connector 210a as described above. Therefore, an output value of the signal line for connecting the first sensor 131 and the main board 200 is variable based on an output value of the phototransistor 214c.

Through such connection of the power supply line and the signal line, it is possible to suppress the numbers of power supply lines and signal lines for connecting the main board 200 and the plurality of sensors (first sensor 131 to third sensor 133). If both the second sensor 132 and the third sensor 133 are directly connected to the main board 200, the numbers of power supply lines and signal lines would increase, and the wiring would become more complicated. In addition, in this case, the number of pins of the connector 203 of the main board 200 and an occupied area thereof increase, thereby the cost increases.

Figure 3:
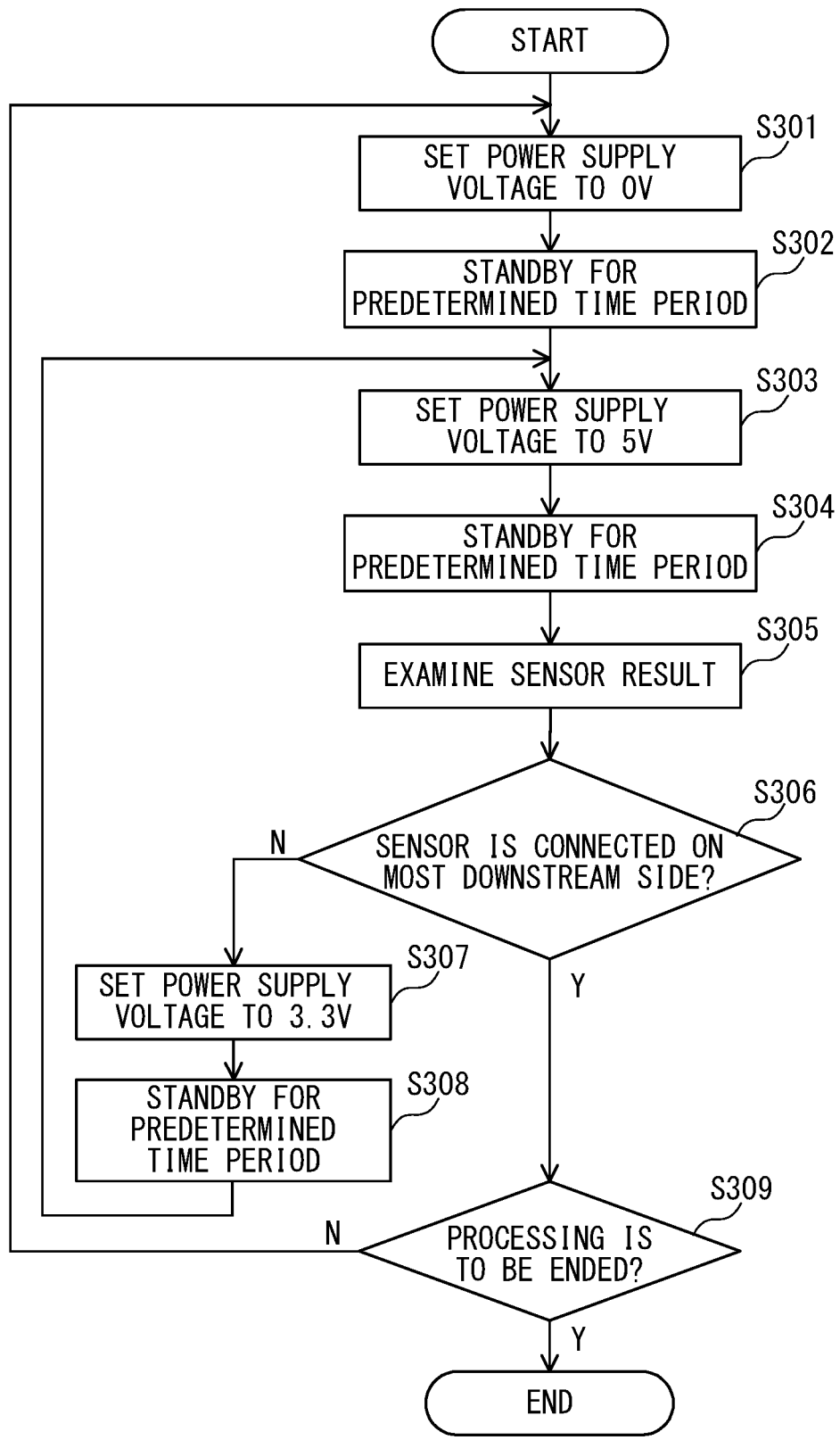
FIG. 3 is a flow chart for illustrating operation control processing.
Figure 4:
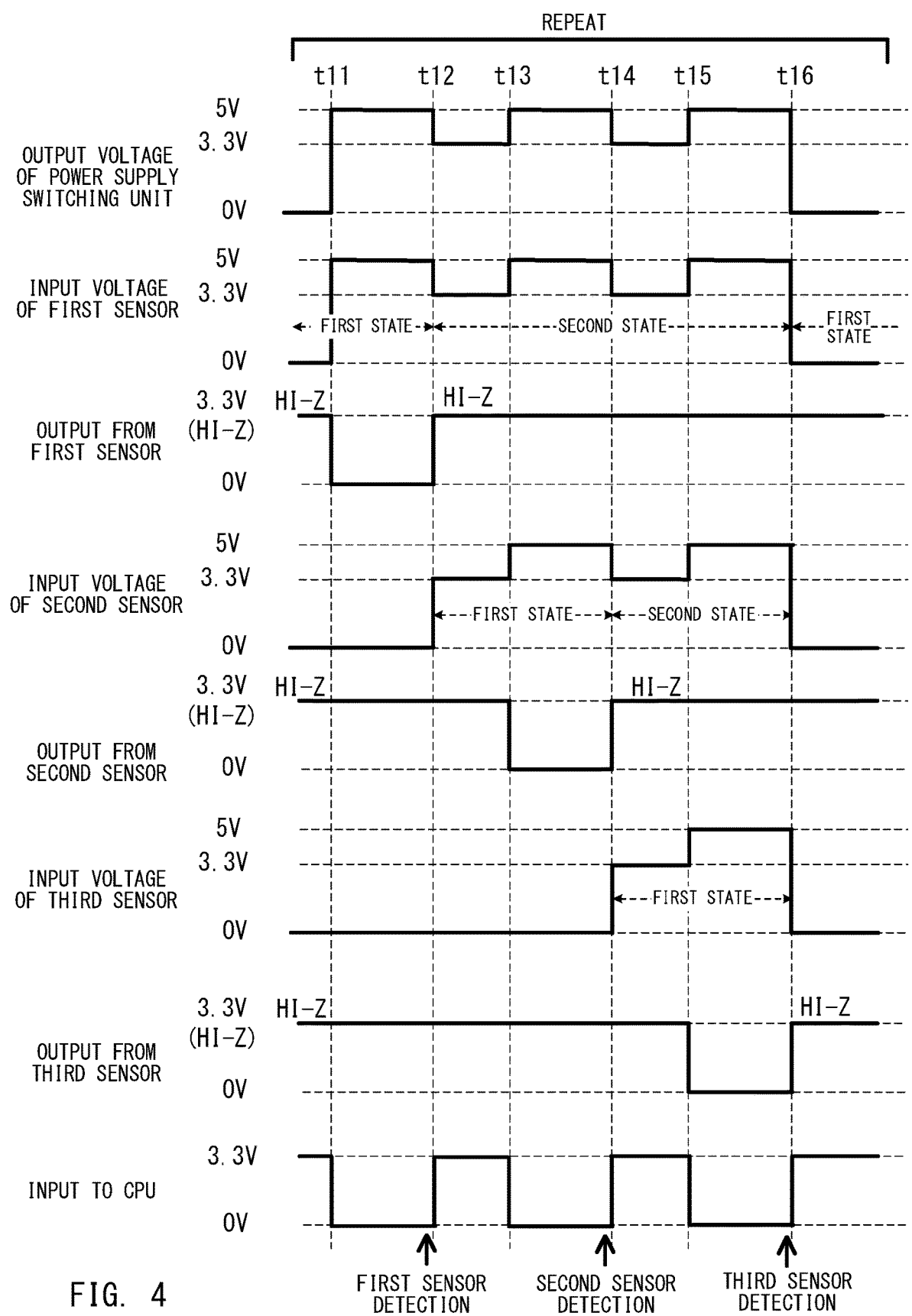
FIG. 4 is a timing chart exhibited when the operation control processing is performed.

FIG. 3 is a flow chart for illustrating operation control processing for controlling a detection operation of a sensor. FIG. 4 is a timing chart exhibited when the operation control processing is performed. The CPU 201 starts the operation control processing, for example, before the sheet 110 is conveyed. The CPU 201 repeatedly executes the operation control processing while the sheet 110 is being conveyed along the conveyance path of the image forming apparatus 100. Then, the sheet 110 is delivered from the image forming apparatus 100. After that, the CPU 201 brings the operation control processing to an end. When the image forming apparatus 100 continuously forms an image on a plurality of sheets 110, the CPU 201 starts the operation control processing before the first sheet among the plurality of sheets 110 is conveyed, and after all the plurality of sheets 110 are delivered, brings the operation control processing to an end.

When the CPU 201 has started the operation control processing, the CPU 201 first sets the power supply voltage output by the power supply switching unit 202 to 0 V (Step S301). The CPU 201 stands by for a predetermined time period (in this embodiment, 100 microseconds) while maintaining the power supply voltage at 0 V (Step S302). The predetermined time period is set as a time period long enough to control the power cutoff units 212a, 212b, and 212c to a cutoff state (state in which the power supply voltage is not supplied to the second sensor 132 and the third sensor 133) being an initial state.

When the predetermined time period has elapsed since the power supply voltage was set to 0 V, the CPU 201 sets the power supply voltage output by the power supply switching unit 202 to 5 V (Step S303). At this time, the voltage detector 211a is in the first state, and the LED controller 215a causes the LED 213a to emit light. The power cutoff unit 212a is in the cutoff state, and hence the power supply voltage is not supplied to the second sensor 132 and the third sensor 133. The CPU 201 stands by for a predetermined time period (in this embodiment, 100 microseconds) while maintaining the power supply voltage at 5 V (Step S304). The predetermined time period is set as a time period longer than a time period to be taken after the power supply voltage is applied to the first sensor 131 until the detection result obtained from the first sensor 131 is input to the CPU 201.

After the predetermined time period has elapsed when the power supply voltage is at 5 V, the CPU 201 acquires the voltage value of the signal line to examine the detection result of the first sensor 131 (Step S305). With the processing of Step S305, the CPU 201 detects based on the voltage value whether the phototransistor 214a of the first sensor 131 is in the conductive state in which light is received or the cutoff state in which light is not received. The phototransistor 214b of the second sensor 132 and the phototransistor 214c of the third sensor 133 are also connected to the signal line for connecting the phototransistor 214a and the CPU 201. However, the power cutoff unit 212a of the first sensor 131 is in the cutoff state, and hence the power supply voltage is not supplied to the second sensor 132 and the third sensor 133. With this arrangement, while the CPU 201 is acquiring the detection result obtained by the phototransistor 214a, the output value (voltage value) of the signal line changes based only on the detection result obtained by the phototransistor 214a.

When the output value of the signal line is 0 V, the CPU 201 determines that the phototransistor 214a of the first sensor 131 is in the conductive state. That is, when the output value of the signal line is 0 V, the first sensor 131 has not detected the sheet 110. Meanwhile, when the output value of the signal line is 3.3 V, the CPU 201 determines that the phototransistor 214a of the first sensor 131 is in the cutoff state. That is, when the output value of the signal line is 3.3 V, the first sensor 131 has detected the sheet 110. In this manner, the CPU 201 acquires the output value of the signal line in the processing of Step S305, to thereby be able to determine the detection state of the first sensor 131.

The processing from Step S303 to Step S305 is processing performed between a time t11 and a time t12 of FIG. 4. In the example of FIG. 4, waveforms exhibited when the light emitted from the LED 213a is received by the phototransistor 214a are illustrated. When a shielding object is provided between the LED 213a and the phototransistor 214a, the phototransistor 214a is brought into the cutoff state, and the output value of 3.3 V is detected.

After acquiring the detection result, the CPU 201 determines whether or not the sensor from which the detection result has been acquired is connected on the most downstream side of the series connection (Step S306). For example, the configurations (including number) of sensors connected in series are registered in advance, and the CPU 201 determines based on the configurations and the number of the acquired detection results whether or not the sensor from which the detection result has been acquired is connected on the most downstream side. In a case where the number of the acquired detection results is smaller than a number determined in advance, the CPU 201 determines that the sensor from which the detection result has been acquired is not the sensor connected on the most downstream side. In addition, in a case where the number of times that, for example, the power supply voltage is dropped from 5 V to 3.3 V reaches a predetermined number, the CPU 201 determines that the sensor is connected on the most downstream side. The predetermined number is determined in advance based on the number of sensors connected in series. When the number of times that the power supply voltage is dropped from 5 V to 3.3 V is smaller than the predetermined number, the CPU 201 determines that the sensor from which the detection result has been acquired is not the sensor connected on the most downstream side.

In a case where the sensor from which the detection result has been acquired is not the sensor connected to the most downstream side (N in Step S306), the CPU 201 controls the power supply switching unit 202 to switch the power supply voltage from 5 V to 3.3 V (Step S307). At this time, the voltage detector 211a detects the falling of the power supply voltage, and is therefore changed from the first state to the second state. The voltage detector 211a subsequently maintains the second state until the power supply voltage reaches 0 V. In a case where the voltage detector 211a is brought into the second state, the power cutoff unit 212a is brought into the conductive state, and is controlled to allow the power supply voltage to be supplied to the second sensor 132 provided on the downstream side. The LED controller 215a of the first sensor 131 is brought into the cutoff state to cut off the current supply to the LED 213a. Therefore, the LED 213a of the first sensor 131 turns out the light. In short, the phototransistor 214a is brought into the cutoff state.

The CPU 201 stands by for a predetermined time period (in this embodiment, 75 microseconds) while maintaining the power supply voltage at 3.3 V (Step S308). It suffices that the predetermined time period is a longer time period than that required for changing the state of the voltage detector 211a of the first sensor 131 to the second state. The processing from Step S306 to Step S308 is processing performed between the time t12 and a time t13 in FIG. 4.

In a case where the power cutoff unit 212a of the first sensor 131 is brought into the conductive state, the power supply voltage can be supplied to the second sensor 132. When the supply of the power supply voltage is started, the voltage detector 211b of the second sensor 132 is controlled to the first state being the initial state. The power cutoff unit 212b of the second sensor 132 is controlled to the cutoff state. The LED controller 215b of the second sensor 132 is brought into the conductive state. The LED 213a emits light by the electric current supplied thereto.

After a lapse of a predetermined time period, the CPU 201 again performs the processing from Step S303 to Step S305. With this processing, the CPU 201 acquires the detection result of the second sensor 132. In the processing of Step S305, the phototransistor 214a of the first sensor 131 and the phototransistor 214c of the third sensor 133 are controlled to a non-operation state. Therefore, the output value of the signal line changes based only on the detection result obtained by the phototransistor 214b of the second sensor 132. The processing from Step S303 to Step S305 is processing performed between the time t13 and a time t14 of FIG. 4.

After acquiring the detection result of the second sensor 132, the CPU 201 determines whether or not the detection result has been acquired from the sensor connected on the most downstream side (Step S306). In this case, the detection result has been acquired from the second sensor 132, and hence the CPU 201 again performs the processing of Step S307 and Step S308. With this processing, the power supply voltage is supplied to the third sensor 133. The processing from Step S306 to Step S308 is processing performed between the time t14 and a time t15 of FIG. 4.

The CPU 201 again performs the processing from Step S303 to Step S305 on the third sensor 133. With this processing, the CPU 201 acquires the detection result of the third sensor 133. In the processing of Step S305, the phototransistor 214a of the first sensor 131, and the phototransistor 214b of the second sensor 132 are controlled to a non-operation state, and is in the open state. Therefore, the output value of the signal line changes based only on the detection result obtained by the phototransistor 214c of the third sensor 133. The processing from Step S303 to Step S305 is processing performed between the time t15 and a time t16 of FIG. 4. In the above-mentioned manner, the CPU 201 acquires the detection result of the sensor at a timing before changing the power supply voltage from 5 V to 3.3 V, thereby being able to acquire a stable detection result.

The third sensor 133 is a sensor connected on the most downstream side. Therefore, the CPU 201 determines that the detection result has been acquired from the sensor connected on the most downstream side of the series connection (Y in Step S306). That is, the number of the acquired detection results is the same as the number determined in advance, and hence the CPU 201 determines that the detection result has been acquired from the sensor connected on the most downstream side. When the detection operation is to be brought to an end (Y in Step S309), the CPU 201 brings the processing to an end. For example, when a print job for continuously forming an image on the plurality of sheets 110 is executed, the CPU 201 brings the detection operation to an end after all sheets conveyed along the conveyance path during the print job are delivered from the image forming apparatus 100.

Meanwhile, when the sheet 110 is being conveyed along the conveyance path, the detection operation is continued. When the detection operation is to be continued (N in Step S309), the CPU 201 returns to the processing of Step S301 to set the power supply voltage output by the power supply switching unit 202 to 0 V, and stands by for a predetermined time period. In Step S301, the power supply voltage of 0 V corresponds to a reset signal for activating a sensor (first sensor 131) connected on the most upstream side as a sensor for acquiring the detection result. The CPU 201 controls the power supply voltage to 0 V after the detection result of the third sensor 133 is acquired, to thereby be able to acquire the detection result obtained from the first sensor 131 among the plurality of sensors. When the power supply voltage is controlled to 0 V, the respective states of the voltage detectors 211a, 211b, and 211c of the first sensor 131 to the third sensor 133, which are connected in series, are initialized to be brought into the first state. The power cutoff units 212a, 212b, and 212c are brought into the cutoff state being the initial state, to thereby cut off the power supply voltage supplied to the sensor connected on the downstream side. The CPU 201 repeatedly performs the processing from Step S303 to Step S309, to thereby be able to repeatedly detect the states of the first sensor 131 to the third sensor 133. In this manner, the first sensor 131 to the third sensor 133 perform detection operations in a predetermined order from the sensor connected on the most upstream side to the sensor connected on the downstream side.

The CPU 201 repeatedly acquires the detection results of the first sensor 131 to the third sensor 133. Then, the image forming apparatus 100 controls the conveyance of the sheet 110 based on the detection results of the first sensor 131, the second sensor 132, and the third sensor 133. A time period to be taken after the CPU 201 acquires the detection result of the first sensor 131 until the CPU 201 acquires the detection result of the third sensor 133 is shorter than a time period to be taken after the sheet 110 passes through the detection position of the first sensor 131 until the sheet 110 passes through the detection position of the second sensor 132. Therefore, during a period after the sheet 110 is fed until the sheet 110 is delivered, the CPU 201 acquires the detection results of the first sensor 131, the second sensor 132, and the third sensor 133 a plurality of times.

With the above-mentioned processing, the first sensor 131 to the third sensor 133 perform the same operation on the input signal (power supply voltage). However, through shifting of the timing to supply power to the respective sensors, the CPU 201 can independently detect the states of all the sensors.

Each sensor can also use the same interface for connection to the main board 200 or another sensor irrespective of the connection point (most upstream, most downstream, or halfway) in the series connection. Therefore, sensors of the same kind can be used as all the sensors, and hence it is not required to manage the correspondence between the connection point and the sensor and to change outer shapes of the individual sensors, and the sensors each have an inexpensive configuration that does not require a complicated control circuit for packet communication or the like. The number of sensors connected in series is three in this embodiment, but it is also possible to further increase the number of sensors under the same control.

Second Embodiment

Figure 5:
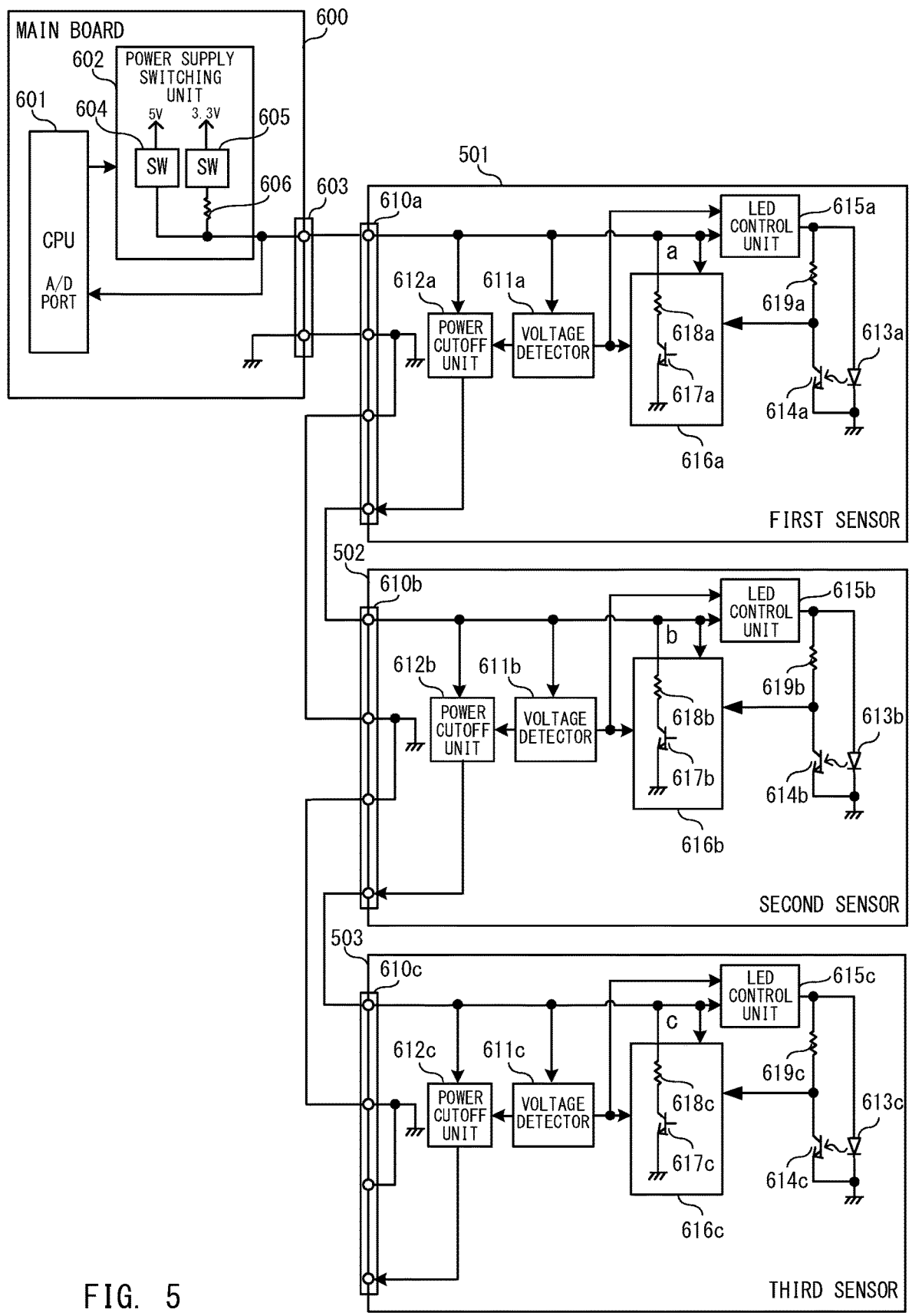
FIG. 5 is a configuration diagram of a main board and sensors.

A second embodiment of the present disclosure is different from the first embodiment in configurations of the main board (sensor control apparatus) and the sensors, but the configuration of the image forming apparatus is the same. The description of the configuration of the image forming apparatus is omitted. FIG. 5 is a configuration diagram of a main board included in the controller and sensors in this embodiment. A main board 600 is a sensor control apparatus configured to control operations of a first sensor 501 to a third sensor 503 to acquire detection results of those sensors.

The first sensor 501 to the third sensor 503 are connected in series to the main board 600. Assuming that the main board 600 is on an upstream side, the first sensor 501 to the third sensor 503 are connected to the main board 600 in order of the first sensor 501, the second sensor 502, and the third sensor 503 from the upstream side. The first sensor 501 to the third sensor 503 have the same internal configuration. The main board 600 and the first sensor 501, the first sensor 501 and the second sensor 502, and the second sensor 502 and the third sensor 503 are connected by different power supply lines. A power supply voltage is applied from the main board 600 to the first sensor 501 to the third sensor 503 by the power supply lines. Further, the respective detection results of the first sensor 501 to the third sensor 503 are input to the main board 600 by the power supply lines. The main board 600, the first sensor 501, the second sensor 502, and the third sensor 503 are connected to a common ground.

The main board 600 includes at least a CPU 601 configured to control the operations of the first sensor 501 to the third sensor 503 and a power supply switching unit 602 configured to switch the power supply voltage to be applied to the first sensor 501 to the third sensor 503. Similarly to the first embodiment, the power supply switching unit 602 applies the power supply voltage having three different kinds of voltage values to the first sensor 501 to the third sensor 503. In this embodiment, the power supply switching unit 202 switches the power supply voltage to be applied to the first sensor 501 to the third sensor 503 among the following three kinds of voltage values: 0 V, 3.3 V, and 5 V. The power supply switching unit 602 includes two switch units (SW) 604 and 605. In a case where the switch unit 604 is in a conductive state and the switch unit 605 is in a cutoff state, the power supply voltage is 5 V. In a case where the switch unit 604 is in a cutoff state and the switch unit 605 is in a conductive state, the power supply voltage is 3.3 V. In a case where both the switch units 604 and 605 are in a cutoff state, the power supply voltage is 0 V. The main board 600 includes, in the power supply switching unit 602, a pull-up resistor 606 for acquiring the detection results of the first sensor 501 to the third sensor 503. A predetermined voltage (in this case, 3.3 V) is applied to one end of the pull-up resistor 606 via the switch unit 605. The main board 600 includes a connector 603 for connection to the first sensor 501 through the power supply line.

The first sensor 501 includes a connector 610a, a voltage detector 611a, a power cutoff unit 612a, an LED 613a, a phototransistor 614a, an LED controller 615a, and a sensor latch unit 616a. The first sensor 501 in this embodiment has a configuration obtained by adding the sensor latch unit 616a to the first sensor 131 in the first embodiment. The same applies to the second sensor 502 and the third sensor 503. Now, differences of the respective components from those in the first embodiment are described.

The sensor latch unit 616a includes a transistor 617a functioning as a switching element and a resistor 618a. The transistor 617a changes to the conductive state or the cutoff state (open state) based on the state of the voltage detector 611a and the operation of the phototransistor 614a. A collector terminal of the transistor 617a is connected to the power supply line of the first sensor 501 at a contact "a" via the resistor 618a. The power supply line connected at the contact "a" is connected to an A/D port of the CPU 601. With such a configuration, the CPU 601 can detect the conductive state or the cutoff state (open state) of the transistor 617a.

The connector 610a is not only connected to the main board 600 through the power supply line, but also connected to the second sensor 502 provided on the downstream side through another power supply line. Unlike in the first embodiment, no signal line is connected to the connector 610a.

The voltage detector 611a detects each of rising and falling of the power supply voltage applied from the main board 600 with, for example, a threshold value of 4 V. However, the voltage detector 611a does not detect the rising when the voltage changes from 0 V to at least 4 V at power-on. The voltage detector 611a is in a "first state" in an initial state at power-on, and maintains the first state until the falling of the applied power supply voltage across 4 V is detected after the applied power supply voltage temporarily becomes equal to or higher than 4 V (for example, 5 V). When the falling of the applied power supply voltage across 4 V is detected, the voltage detector 611a is brought into a "second state". After that, when the rising of the applied power supply voltage across 4 V is detected, the voltage detector 611a is brought into a "third state". The voltage detector 611a that has been brought into the third state maintains the third state until the power supply voltage changes to 0 V. The changing of the power supply voltage to 0 V is referred to as "initialization".

In a case where the voltage detector 611a is in the initial state (first state) at power-on, the power cutoff unit 612a is brought into the cutoff state in which the power supply voltage is not supplied to the second sensor 502 on the downstream side. In a case where the voltage detector 611a is in the second state, the power cutoff unit 612a is also in the cutoff state. In a case where the voltage detector 611a is brought into the third state, the power cutoff unit 612a is brought into the conductive state in which the power supply voltage is supplied to the second sensor 502 on the downstream side.

In a case where the voltage detector 611a is in the first state, the LED controller 615a is brought into the conductive state, and supplies an electric current to the LED 613a to cause the LED 613a to emit light. In a case where the voltage detector 611a is brought into the second state, the LED controller 615a is brought into the cutoff state, and cuts off the electric current supplied to the LED 613a to turn out the light. Even when the voltage detector 611a is brought into the third state after that, the LED controller 615a maintains the cutoff state until the power supply voltage is changed to 0 V (is initialized).

In a case where the voltage detector 611a is in the first state, the transistor 617a of the sensor latch unit 616a is brought into a cutoff state. In a case where the voltage detector 611a is switched from the first state to the second state, the sensor latch unit 616a latches a state signal obtained from the phototransistor 614a, and operates the transistor 617a based on the latched result.

In a case where the phototransistor 614a is in the conductive state (with an input of 0 V) when the voltage detector 611a is switched from the first state to the second state, the sensor latch unit 616a maintains the transistor 617a in a conductive state. In a case where the phototransistor 614a is in the cutoff state (with an input at a power supply voltage level), the sensor latch unit 616a maintains the transistor 617a in a cutoff state.

When the voltage detector 611a is switched to the third state after that, the sensor latch unit 616a brings the transistor 617a into the cutoff state. The sensor latch unit 616a maintains this state until the power supply voltage is changed to 0 V (initialized). In this manner, the sensor latch unit 616a can maintain a light receiving state of the phototransistor 614a.

A connector 610b of the second sensor 502 is not only connected to the first sensor 501 on the upstream side through the power supply line, but also connected to the third sensor 503 provided on the downstream side through another power supply line. To the connector 610b, such a signal line as described in the first embodiment is not connected. The second sensor 502 includes a voltage detector 611b, a power cutoff unit 612b, an LED 613b, a phototransistor 614b, an LED controller 615b, and a sensor latch unit 616b. Operations of the respective components are the same as the operations of the respective corresponding components of the first sensor 501, and hence descriptions thereof are omitted.

A collector terminal of a transistor 617b in the sensor latch unit 616b is connected to the power supply line of the second sensor 502 at a contact "b" via a resistor 618b. The contact "b" is connected to the A/D port of the CPU 601 of the main board 600 via the first sensor 501. With such a configuration, the CPU 601 can detect a conductive state or a cutoff state of the transistor 617b.

A connector 610c of the third sensor 503 is connected to the second sensor 502 on the upstream side through the power supply line. The third sensor 503 is arranged on the most downstream side of series connection, and hence the connector 610c is not connected to any component in the subsequent stage. To the connector 610c, such a signal line as described in the first embodiment is not connected. The third sensor 503 includes a voltage detector 611c, a power cutoff unit 612c, an LED 613c, a phototransistor 614c, an LED control unit 615c, and a sensor latch unit 616c. Operations of the respective components are the same as the operations of the respective corresponding components of the first sensor 501, and hence descriptions thereof are omitted.

A collector terminal of a transistor 617c in the sensor latch unit 616c is connected to the power supply line of the third sensor 503 at a contact "c" via a resistor 618c. The contact "c" is connected to the A/D port of the CPU 601 of the main board 600 via the first sensor 501 and the second sensor 502. With such a configuration, the CPU 601 can detect a conductive state or a cutoff state of the transistor 617c.

The power supply line can be connected in this manner, to thereby suppress the number of power supply lines for connecting the main board 600 and the plurality of sensors (first sensor 501 to third sensor 503). In addition, the power supply line is used both for supplying the power supply voltage and for acquiring the detection result, and hence series wires for connecting the main board 600 and the respective sensors (first sensor 501 to third sensor 503) can be reduced to two lines including a ground line.

Figure 6:
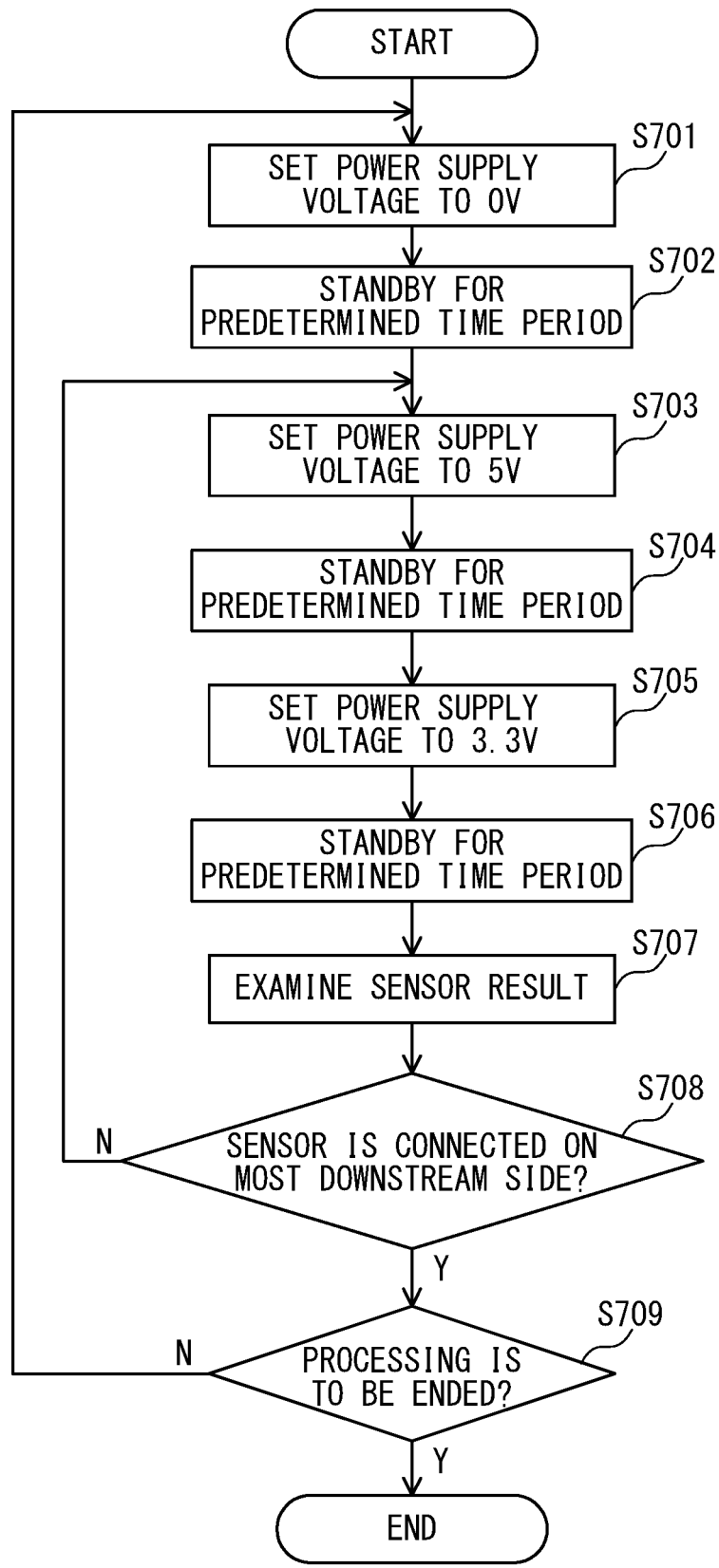
FIG. 6 is a flow chart for illustrating operation control processing.
Figure 7:
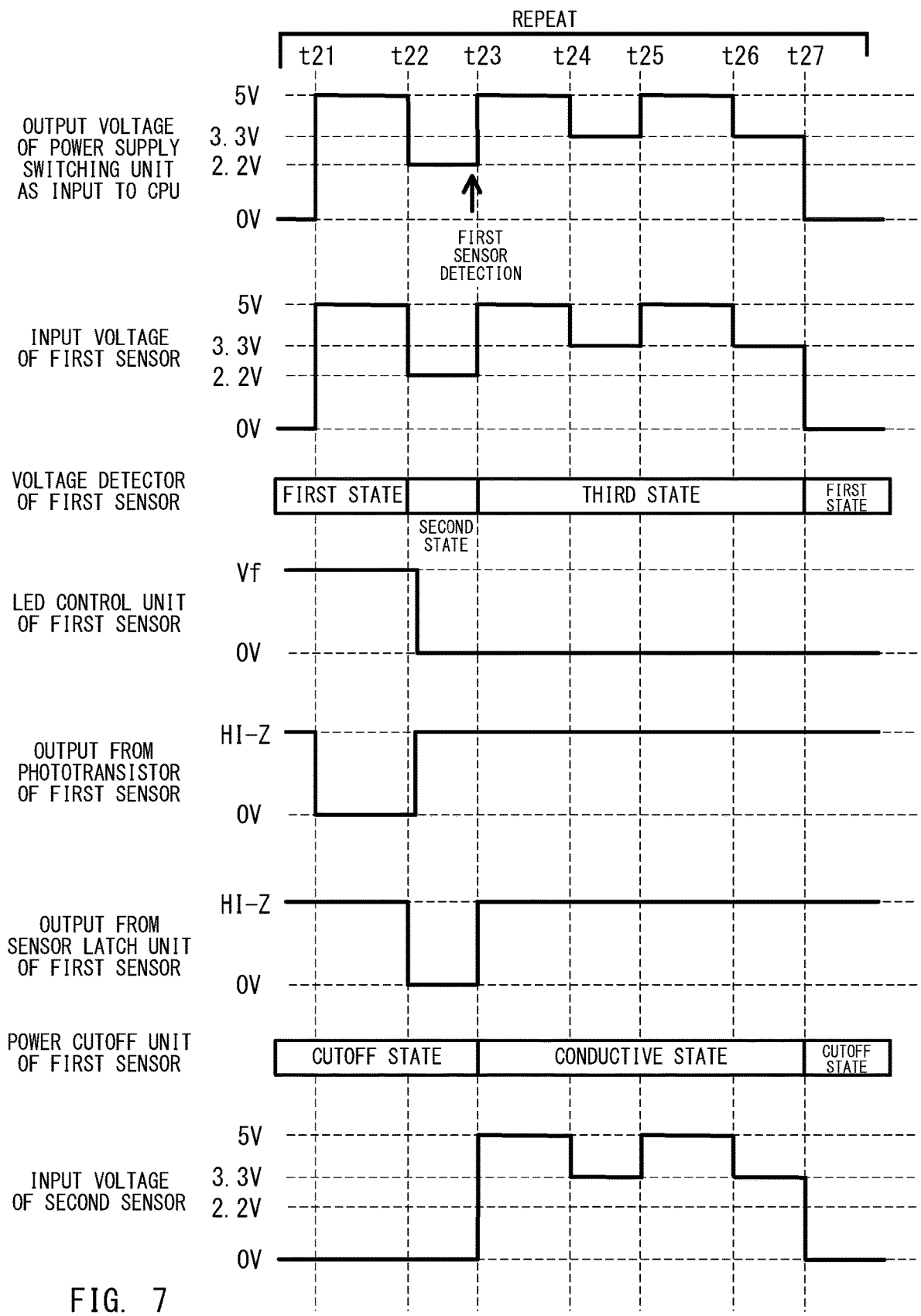
FIG. 7 is a timing chart exhibited when the operation control processing is performed between the main board and a first sensor.
Figure 8:
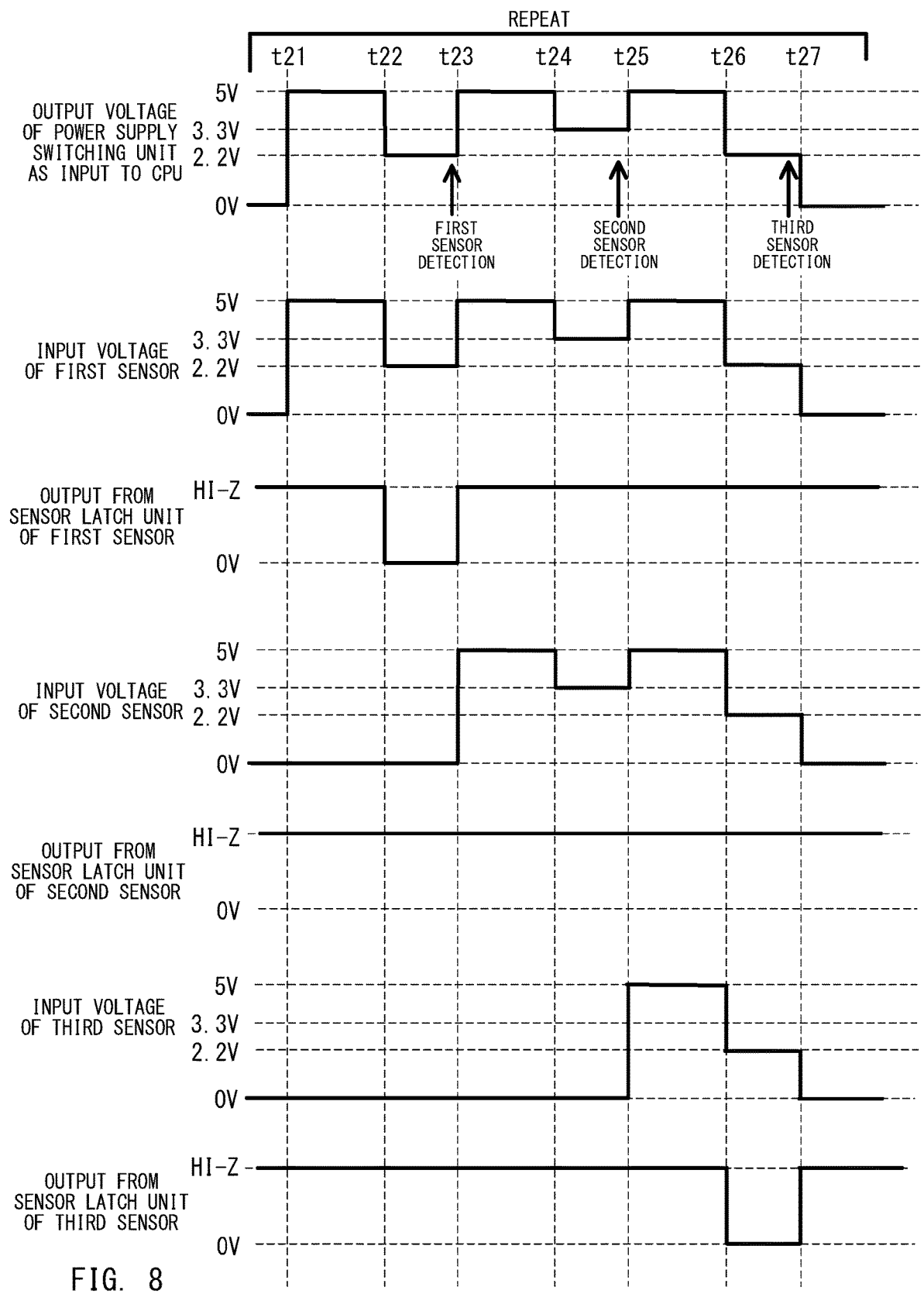
FIG. 8 is a timing chart exhibited when the operation control processing is performed.

FIG. 6 is a flow chart for illustrating operation control processing for controlling a detection operation of a sensor, which is performed by the above-mentioned main board 600. FIG. 7 is a timing chart exhibited when operations of the main board 600 and the first sensor 501 are controlled. FIG. 8 is a timing chart exhibited when operations are controlled.

The processing from Step S701 to Step S703 is the same as the processing from Step S301 to Step S303 of FIG. 3. The CPU 601 stands by while maintaining the power supply voltage (5 V) set in Step S703 for a predetermined time period (Step S704). The predetermined time period is a time period during which the LED 613a emits light and the light receiving operation is reliably performed by the phototransistor 614a.

After a lapse of the predetermined time period, the CPU 601 causes the power supply switching unit 602 to set the power supply voltage to 3.3 V pulled up by the pull-up resistor 606 (Step S705). With this setting, the voltage detector 611a detects the falling of the power supply voltage to be brought into the second state. In a case where the voltage detector 611a is brought into the second state, the sensor latch unit 616a latches the state of the phototransistor 614a to switch the operation state of the transistor 617a. The sensor latch unit 616a maintains the transistor 617a in the conductive state in a case where the phototransistor 614a is in the conductive state, and maintains the transistor 617a in the cutoff state in a case where the phototransistor 614a is in the cutoff state.

In a case where the voltage detector 611a is brought into the second state, the LED controller 615a is brought into the cutoff state, and the LED 613a turns out the light. The LED 613a turns out the light, and hence the phototransistor 614a is brought into the cutoff state. At this time, when the LED 613a completes an operation for turning out the light early with respect to a latching operation performed by the sensor latch unit 616a, there is a fear that the sensor latch unit 616a may fail to acquire the state of the phototransistor 614a exhibited when the LED 613a emits light, which is originally to be acquired. Therefore, the voltage detector 611a delays the transmission of the control signal to the LED controller 615a as compared to the transmission of the switching signal to the sensor latch unit 616a. The processing from Step S703 to Step S705 is processing performed between a time t21 and a time t22 of FIG. 7 and FIG. 8.

The CPU 601 stands by for a predetermined time period (in this embodiment, 75 microseconds) while maintaining the power supply voltage at 3.3 V (Step S706). The predetermined time period is a time period longer than a time period for switching the states of the voltage detector 611a and the sensor latch unit 616a.

When the predetermined time period has elapsed with the power supply voltage being maintained at 3.3 V, the CPU 601 acquires the voltage value of a power supply line to which the contact "a" in the first sensor 501 is connected to examine the detection result of the first sensor 501 (Step S707). With the above-mentioned processing, the CPU 601 detects whether the transistor 617a is in an operation state or a non-operation state (open). The processing of Step S706 and Step S707 is processing performed between the time t22 and a time t23 of FIG. 7 and FIG. 8.

The power supply line for connecting the contact "a" in the first sensor 501 and the CPU 601 is also connected to the power supply line from the second sensor 502 and the third sensor 503. However, the power cutoff unit 612a of the first sensor 501 is in the cutoff state, and hence the power supply voltage is not supplied to the second sensor 502 and the third sensor 503. The voltage detector 611a and the LED controller 615a are also connected to the contact "a" in the first sensor 501, but an electric current consumed by lighting control in the voltage detector 611a and the LED 613a are small with no electric current flowing through the LED 613a, and thus current consumption is minute.

For this reason, at the time of the processing of Step S707, the power supply line is dominated by the transistor 617a at a time when the transistor 617a operates. Therefore, the voltage value at the contact "a" (power supply line) connected to the A/D port of the CPU 601 is substantially determined based on the conductive state and the cutoff state of the transistor 617a.

In a case where the transistor 617a is in the conductive state, the voltage value to be acquired by the CPU 601 is determined based on a voltage dividing ratio between the pull-up resistor 606 and the resistor 618a. In this embodiment, assuming that the pull-up resistor 606 has a resistance value of 1.1 kΩ and the resistor 618a has a resistance value of 2.2 kΩ, the CPU 601 detects about 2.2 V (first sensor 501 detection of FIG. 7 and FIG. 8). In a case where the transistor 617a is in the cutoff state, no electric current flows through the transistor 617a as well, and almost no electric current flows through the power supply line. Therefore, the CPU 601 detects about 3.3 V.

The CPU 601 compares an A/D conversion result of the voltage value acquired at the A/D port with a predetermined threshold value to determine whether or not the transistor 617a is in the conductive state. In this embodiment, the threshold value is set to 2.75 V. In a case where the A/D conversion result is lower than 2.75 V, the CPU 601 determines that the transistor 617a is in the conductive state, and that the first sensor 501 has not detected the sheet 110. In a case where the A/D conversion result is equal to or higher than 2.75 V, the CPU 601 determines that the transistor 617a is in the cutoff state, and that the first sensor 501 has detected the sheet 110.

In FIG. 7 and FIG. 8, waveforms exhibited when the light emitted from the LED 613a is received by the phototransistor 614a are illustrated for the sake of description. A shielding object is not provided between the LED 613a and the phototransistor 614a, and hence the phototransistor 614a receives light to be brought into the conductive state, which also brings the transistor 617a in the sensor latch unit 616a into the conductive state. In this case, the voltage value acquired by the CPU 601 is 2.2 V. When a shielding object is provided between the LED 613a and the phototransistor 614a, the phototransistor 614a does not receive light, and is brought into the cutoff state (high impedance), while the transistor 617a in the sensor latch unit 616a is also brought into the cutoff state (high impedance). In this case, the voltage value acquired by the CPU 601 is 3.3 V.

The CPU 601, which has acquired the detection result of the sensor, determines whether or not the sensor is connected on the most downstream side (Step S708). For example, the configurations (including number) of sensors connected in series are registered in the CPU 601 in advance, and the CPU 601 determines based on the configurations and the number of the acquired detection results whether or not the sensor from which the detection result has been acquired is connected on the most downstream side. In this case, the CPU 601 has acquired the detection result of the first sensor 501. Therefore, the CPU 601 determines that the sensor from which the detection result has been acquired is not connected on the most downstream side (N in Step S708), and again repeats the processing of Step S703 and the subsequent steps.

The CPU 601 sets the power supply voltage output by the power supply switching unit 602 to 5 V (Step S703). At this time, the voltage detector 611a of the first sensor 501 is changed to the third state. For that reason, the sensor latch unit 616a brings the transistor 617a into the cutoff state. The power cutoff unit 612a is brought into the conductive state, and the power supply voltage is supplied to the second sensor 502 on the downstream side. In the same manner as in the case of the first sensor 501, the CPU 601 acquires the detection result of the second sensor 502 (Step S704, Step S705, Step S706, and Step S707). In the processing of Step S707, the transistor 617a of the first sensor 501 is in the cutoff state, and the third sensor 503 is not operating. Therefore, the input signal supplied to the A/D port of the CPU 601 changes based only on the state of the transistor 617b of the second sensor 502. The processing from Step S703 to Step S707 is processing performed between the time t23 and a time t25 of FIG. 8. In FIG. 8, a shielding object is provided between the LED 613b and the phototransistor 614b of the second sensor 502, and the phototransistor 614b does not receive light to be brought into the cutoff state (high impedance). In this case, the voltage value acquired by the CPU 601 is 3.3 V.

The second sensor 502 is not connected on the most downstream side (N in Step S708), and hence the CPU 601, which has acquired the detection result of the second sensor 502, again repeats the processing of Step S703 and the subsequent steps.

The CPU 601 sets the power supply voltage output by the power supply switching unit 602 to 5 V (Step S703). At this time, the voltage detector 211b of the second sensor 502 is changed to the third state. For that reason, the sensor latch unit 616b brings the transistor 617b into the cutoff state. The power cutoff unit 612b is brought into the conductive state, and the power supply voltage is supplied to the third sensor 503 on the downstream side. In the same manner as in the cases of the first sensor 501 and the second sensor 502, the CPU 601 acquires the detection result of the third sensor 503 (Step S704, Step S705, Step S706, and Step S707). In the processing of Step S707, the transistor 617a of the first sensor 501 and the transistor 617b of the second sensor 502 are in the cutoff state. Therefore, the input signal supplied to the A/D port of the CPU 601 changes based only on the state of the transistor 617c of the third sensor 503. The processing from Step S703 to Step S707 is processing performed between the time t25 and a time t27 of FIG. 8. In FIG. 8, a shielding object is not provided between the LED 613b of the second sensor 502 and the phototransistor 614b, and hence the phototransistor 614b receives light to be brought into the conductive state. In this case, the voltage value acquired by the CPU 601 is 2.2 V.

The CPU 601, which has acquired the detection result of the third sensor 503, determines whether or not the third sensor 503 is connected on the most downstream side (Step S708). The CPU 601 has acquired the detection result of the third sensor 503, and hence determines that the sensor from which the detection result has been acquired is connected on the most downstream side (Y in Step S708). When the detection operation is to be brought to an end (Y in Step S709), the CPU 601 brings the processing to an end.

When the detection operation is to be continued (N in Step S709), the CPU 601 returns to the processing of Step S701 to set the power supply voltage output by the power supply switching unit 602 to 0 V, and stands by for a predetermined time period. With this processing, the respective states of the voltage detectors 611a, 611b, and 611c of the first sensor 501 to the third sensor 503, which are connected in series, are initialized to be brought into the first state. The power cutoff units 612a, 612b, and 612c are brought into the cutoff state being the initial state, to thereby cut off the power supply voltage connected to the sensor on the downstream side. After that, the CPU 601 repeatedly performs the processing from Step S703 to Step S709, to thereby be able to detect the states of the first sensor 501 to the third sensor 503 at all times. In this manner, the first sensor 501 to the third sensor 503 perform the detection operation in order.

With the above-mentioned processing, the first sensor 501 to the third sensor 503 perform the same operation on the input signal (power supply voltage). However, through shifting of the timing to supply power to the respective sensors, the CPU 601 can independently detect the states of all the sensors.

Each sensor can use not only the same interface for connection to the main board 600 but also another sensor irrespective of the connection point (most upstream, most downstream, or halfway) in the series connection. Therefore, sensors of the same kind can be used as all the sensors, and hence it is not required to manage the correspondence between the connection point and the sensor and to change outer shapes of the individual sensors. Further, the number of sensors connected in series is three in this embodiment, but it is also possible to further increase the number of sensors under the same control.

Figure 9:
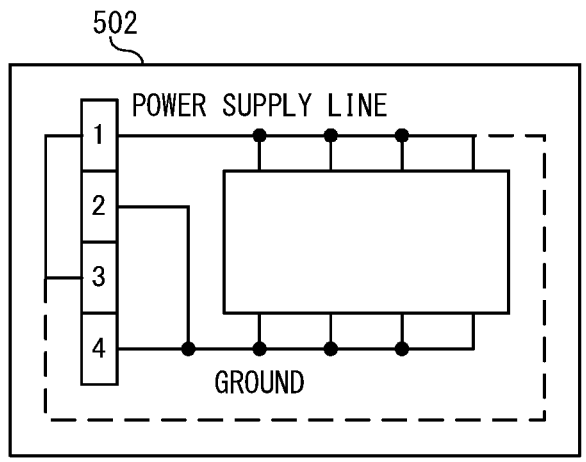
FIG. 9 is an explanatory diagram of a terminal arrangement of a sensor.

Now, a description is given of terminal arrangements of the connectors 610a to 610c of the respective sensors in the second embodiment. FIG. 9 is an explanatory diagram of a terminal arrangement of the connector of a sensor. The number of required terminals of the connector is at least four, namely, a terminal for acquiring the power supply voltage from the main board and the sensor on the upstream side, a terminal for supplying the power supply voltage to the sensor on the downstream side, a terminal for sharing a ground with the main board and the sensor on the upstream side, and a terminal for sharing a ground with the sensor on the downstream side. In the terminal arrangement of the connector illustrated in FIG. 9, a first terminal and a third terminal are connected to the power supply line, and a second terminal and a fourth terminal are grounded. In this case, in order to connect the first terminal and third terminal and connect the second terminal and fourth terminal through pattern wiring inside a sensor board 500, the pattern wiring requires a first pattern, a second pattern, and other such bypass patterns. Such bypass patterns cause the area of the sensor board 500 to increase.

Figure 10:
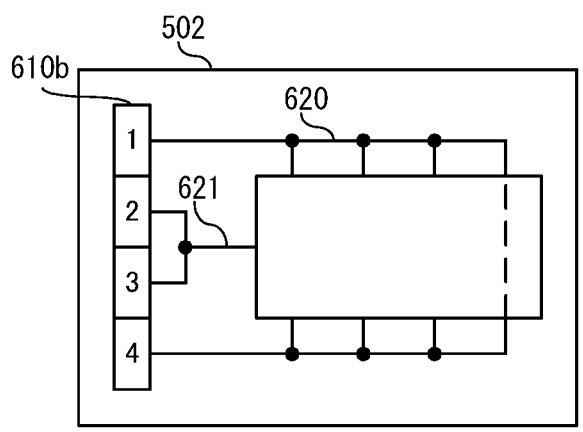
FIG. 10 is an explanatory diagram of a terminal arrangement of a sensor.

FIG. 10 is an explanatory diagram of a terminal arrangement of the connector 610b of the second sensor 502. In the terminal arrangement of the connector 610b of the second sensor 502, the first terminal and the fourth terminal arranged at outer positions are connected to the power supply line, and the second terminal and the third terminal arranged at inner positions are grounded. In this case, a pattern wiring 620 for the power supply line and a grounded pattern wiring 621 avoid intersecting each other inside the board of the second sensor 502. Therefore, the pattern wiring of an unnecessary bypass pattern is no longer required, to thereby be able to reduce the area of the board of the second sensor 502 to a size smaller than that in the case of FIG. 9.

In addition, in this terminal arrangement, bundled wires connected to the connector 610b are designed in a one-to-N connection relationship, and hence the connector 610b can be mass-produced. Therefore, this terminal arrangement can suppress the cost of the sensor board as well.

Figure 11:
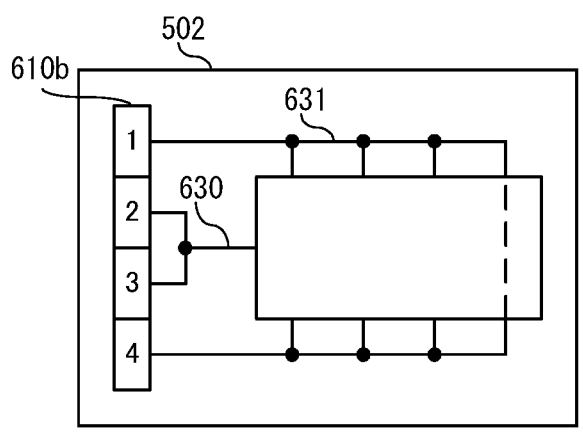
FIG. 11 is an explanatory diagram of a terminal arrangement of a sensor.

FIG. 11 is an explanatory diagram of another terminal arrangement of the connector 610b of the second sensor 502. In the terminal arrangement of the connector 610b of the second sensor 502, the first terminal and the fourth terminal arranged at outer positions are grounded, and the second terminal and the third terminal arranged at inner positions are connected to the power supply line. In this case, a pattern wiring 630 for the power supply line and a grounded pattern wiring 631 avoid intersecting each other inside the board of the second sensor 502. Therefore, the pattern wiring of an unnecessary bypass pattern is no longer required, to thereby be able to reduce the area of the board of the second sensor 502 to a size smaller than that in the case of FIG. 9. In addition, with this configuration, the circuit part of the second sensor 502 is surrounded by the grounded pattern wiring 631. This improves antinoise performance of the circuit part of the second sensor 502.

With such terminal arrangements described above with reference to FIG. 10 and FIG. 11, unnecessary bypass patterns can be reduced from the pattern wiring inside the sensor board, and the area of the board can be reduced. For those reasons, those terminal arrangements are effective in suppressing the cost of the sensor. The above description has been made by taking the second sensor 502 as an example, but the same board can be employed for the first sensor 501 and the third sensor 503.

As described above, in each embodiment, a plurality of sensors are connected in series to the main board. The main board alternately applies two kinds of power supply voltages (5 V and 3.3 V) to a plurality of sensors, to thereby cause the respective sensors to sequentially perform the detection operations. The main board applies another power supply voltage (0 V), to thereby cause the sensors to sequentially perform the detection operations again from the sensor in the first stage. For example, the main board sequentially applies the power supply voltages having the respective voltage values irrespective of the conveyance timing of the sheet 110.

The sensor includes a power input terminal for supplying power from main control and a power output terminal for supplying power to the sensor connected in series on the downstream side, and has a power cutoff mechanism between the power input terminal and the power output terminal. This allows each sensor to independently perform detection with a configuration in which a plurality of sensors of the same kind (of the same outer shape and having the same internal circuit) are connected in series. Therefore, it is possible to reduce the number of cables and the number of connectors, and suppress the cost and the component management cost.

The present disclosure is not limited to the embodiments described above, and various changes and modifications can be made without departing from the spirit and scope of the present disclosure. The following claims are appended hereto in order to make the scope of the present disclosure public.

According to the present disclosure, each sensor is allowed to independently perform detection even with a configuration in which a plurality of sensors having the same configuration are connected in series.

The invention claimed is:

1. A sensor control apparatus, comprising:
a control unit; and
a plurality of sensors connected in series to the control unit,
each of the plurality of sensors including:
a detector configured to perform a detection operation based on a first voltage applied from the control unit;
a first switch provided on an application path for applying a voltage, which extends from the control unit to the detector;
a second switch provided on a supply path for supplying the voltage applied from the control unit to a sensor connected in a subsequent stage; and
a conduction control unit configured to:
bring the first switch into conduction and cut off the second switch in a case where the voltage on the application path is the first voltage; and
cut off the first switch and bring the second switch into conduction in a case where the voltage on the application path is a second voltage, which is different from the first voltage,
wherein the control unit is configured to cause a sensor in a first stage to perform the detection operation by applying the first voltage to the sensor in the first stage, and then cause a sensor in a second stage to perform the detection operation by applying the second voltage and then applying the first voltage.

2. The sensor control apparatus according to claim 1, wherein the control unit is configured to cause a sensor in a third stage to perform the detection operation by applying the second voltage after causing the sensor in the second stage to perform the detection operation, and then applying the first voltage.

3. The sensor control apparatus according to claim 1, wherein the control unit is configured to cause the plurality of sensors to sequentially perform the detection operations by alternately applying the first voltage and the second voltage.

4. The sensor control apparatus according to claim 1, wherein, in a case where the first switch is cut off and the second switch is brought into conduction, the conduction control unit maintains a conductive state achieved by the conduction until a third voltage, which is different from the first voltage and the second voltage, is applied to the application path.

5. The sensor control apparatus according to claim 4, wherein, in a case where all the plurality of sensors have performed the detection operations, the control unit applies the third voltage to cause the plurality of sensors to sequentially perform the detection operations again from the sensor in the first stage.

6. The sensor control apparatus according to claim 1, wherein the control unit is configured to acquire a detection result obtained from each of the plurality of sensors at a timing after the first voltage is applied before the second voltage is applied.

7. The sensor control apparatus according to claim 6, wherein the detector includes:
a light emitter configured to emit light by having the first voltage applied thereto; and
a light receiver to be brought into conduction by receiving the light emitted from the light emitter, and
wherein the control unit is connected to the light receiver, and is configured to acquire the detection result based on a conductive state of the light receiver.

8. The sensor control apparatus according to claim 1, wherein the plurality of sensors each further include a holding unit configured to hold a detection result, and wherein the control unit is configured to apply the second voltage to cause the conduction control unit to cut off the first switch, and acquire the detection result from the holding unit through the application path.

9. The sensor control apparatus according to claim 8, wherein the detector includes:
   a light emitter configured to emit light by having the first voltage applied thereto; and
   a light receiver to be brought into conduction by receiving the light emitted from the light emitter,
wherein the holding unit includes a third switch configured to change a conduction state thereof based on a conductive state of the light receiver, and
wherein the control unit is connected to the third switch, and is configured to acquire the detection result based on a conductive state of the third switch.

10. The sensor control apparatus according to claim 8, wherein the plurality of sensors each include a connector including a first terminal for acquiring a voltage from the control unit and a sensor on an upstream side, a second terminal for supplying a voltage to the sensor connected in the subsequent stage, a third terminal for sharing a ground with the control unit and the sensor on the upstream side, and a fourth terminal for sharing a ground with the sensor connected in the subsequent stage, and
wherein the first terminal and the second terminal are arranged at outer positions of the connector, and the third terminal and the fourth terminal are arranged at inner positions of the connector.

11. The sensor control apparatus according to claim 8, wherein the plurality of sensors each include a connector including a first terminal for acquiring a voltage from the control unit and a sensor on an upstream side, a second terminal for supplying a voltage to the sensor connected in the subsequent stage, a third terminal for sharing a ground with the control unit and the sensor on the upstream side, and a fourth terminal for sharing a ground with the sensor connected in the subsequent stage, and
wherein the first terminal and the second terminal are arranged at inner positions of the connector, and the third terminal and the fourth terminal are arranged at outer positions of the connector.

12. An image forming apparatus, comprising:
a sensor control apparatus;
a container configured to receive a sheet;
an image forming unit configured to form an image on the sheet; and
a conveyor configured to convey the sheet from the container to the image forming unit through a conveyance path,
   the sensor control apparatus including:
      a control unit; and
      a plurality of sensors connected in series to the control unit,
   the plurality of sensors each including:
      a detector configured to perform a detection operation based on a first voltage applied from the control unit;
      a first switch provided on an application path for applying a voltage, which extends from the control unit to the detector;
      a second switch provided on a supply path for supplying the voltage applied from the control unit to a sensor connected in a subsequent stage; and
      a conduction control unit configured to:
         bring the first switch into conduction and cut off the second switch in a case where the voltage on the application path is the first voltage; and
         cut off the first switch and bring the second switch into conduction in a case where the voltage on the application path is a second voltage, which is different from the first voltage,
   the control unit being configured to cause a sensor in a first stage to perform the detection operation by applying the first voltage to the sensor in the first stage, and then cause a sensor in a second stage to perform the detection operation by applying the second voltage and then applying the first voltage,
   the plurality of sensors being arranged on the conveyance path at predetermined intervals, and being configured to detect the sheet.

13. The image forming apparatus according to claim 12, wherein the control unit of the sensor control apparatus is configured to apply the first voltage, the second voltage, and a third voltage irrespective of a conveyance timing of the sheet.

* * * * *